United States Patent [19]

Fujioka et al.

[11] Patent Number: 4,483,151
[45] Date of Patent: Nov. 20, 1984

[54] CAR AIR CONDITIONER WITH A FREEZER/REFRIGERATOR

[75] Inventors: Kenji Fujioka, Gamagori; Takayuki Morita; Kenichi Fujiwara, both of Kariya; Kouji Ito, Nagoya, all of Japan

[73] Assignee: Nippondenso Co., Ltd., Kariya, Japan

[21] Appl. No.: 388,661

[22] Filed: Jun. 15, 1982

[30] Foreign Application Priority Data

Jun. 16, 1981 [JP] Japan .................................. 56-93456

[51] Int. Cl.$^3$ .................. G05D 23/19; F25B 5/00; B60H 3/04; F25D 11/02
[52] U.S. Cl. ......................................... 62/157; 62/200; 62/243; 62/244; 62/443; 165/43
[58] Field of Search ................. 62/157, 231, 199, 200, 62/525, 244, 243, 443, 446; 165/42, 43

[56] References Cited

U.S. PATENT DOCUMENTS

| | | | |
|---|---|---|---|
| 2,128,020 | 8/1938 | Smilack | 62/199 |
| 2,133,962 | 10/1938 | Shoemaker | 62/199 |
| 2,328,189 | 8/1943 | Brace et al. | 62/446 X |
| 2,497,903 | 2/1950 | Muffly | 62/157 |
| 3,858,405 | 1/1975 | Manzke | 62/243 X |

*Primary Examiner*—Harry B. Tanner
*Attorney, Agent, or Firm*—Cushman, Darby & Cushman

[57] ABSTRACT

This invention provides a freezer/refrigerator system which has a compressor driven by an engine of a vehicle to equally supply a refrigerant under pressure to a cooler unit and a freezer/refrigerator unit. An electromagnetic valve is disposed in a refrigerant inlet pipe of the cooler unit, while a constant-pressure expansion valve which is opened at a given pressure corresponding to a proper vaporizing temperature of the refrigerant is disposed at the refrigerant inlet pipe of the freezer/refrigerator unit. A control circuit supplies a control signal to the electromagnetic valve which is opened for 1 minute and closed for 15 seconds. The refrigerant is alternately supplied to the cooler unit and the freezer/refrigerator unit upon opening/closing of the constant-pressure expansion valve in accordance with changes in the pressure of the refrigerant.

15 Claims, 14 Drawing Figures

FIG. 3
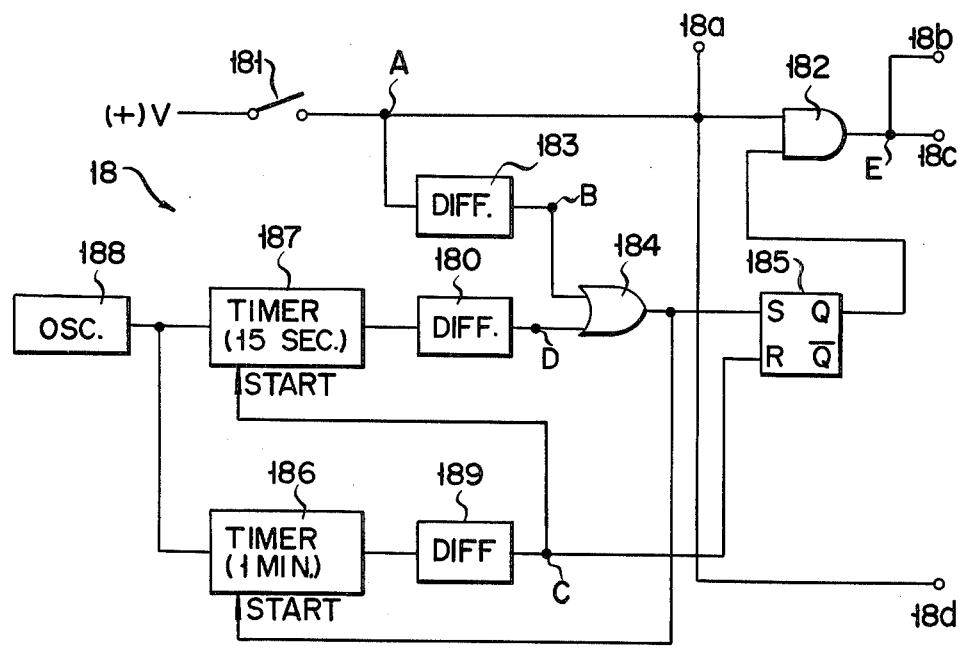
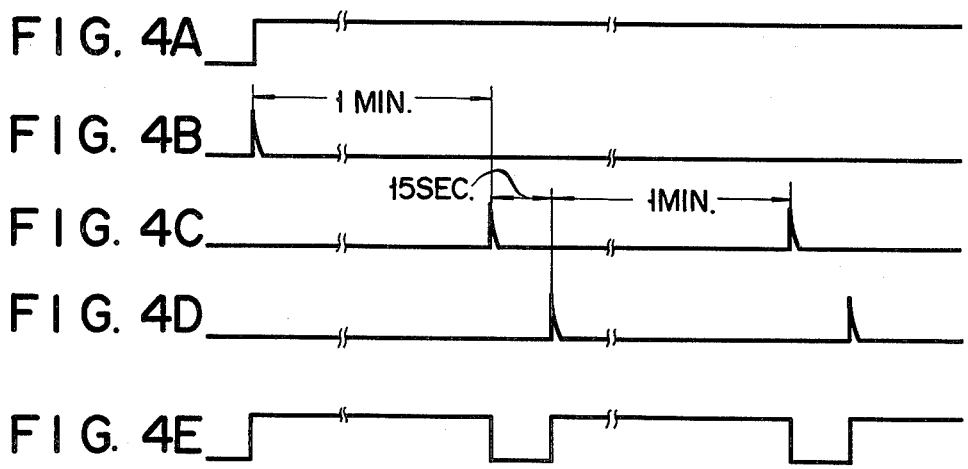
FIG. 4A
FIG. 4B
FIG. 4C
FIG. 4D
FIG. 4E

CAR AIR CONDITIONER WITH A FREEZER/REFRIGERATOR

BACKGROUND OF THE INVENTION

The present invention relates to a car air conditioner with a freezer/refrigerator which is assisted by an air conditioning system driven by the engine of a car to chill or freeze food and drink or to make ice.

Wagons are used as leisure vehicles in accordance with various purposes. When a driver wishes to travel a long distance or go on a camping tour by a wagon, he generally carries food and beverages in the car. Usually, it is desired to keep the food and beverages cold. Further, icing as well as freeze storage of food are required.

SUMMARY OF THE INVENTION

It is therefore, an object of the present invention to provide a freezer/refrigerator system which is to be installed in a vehicle and which has an ice-making function and a cold storage function for food and beverages to be stored therein.

It is another object of the present invention to provide a freezer/refrigerator system which is driven by the engine of a vehicle and controlled thereby.

It is still another object of the present invention to provide a freezer/refrigerator system which is easy to install and which requires only a limited space inside the vehicle and which performs cold storage for food and beverages as well as facilitates making ice.

It is still another object of the present invention to provide a freezer/refrigerator system which has a warm storage function for warm beverages such as coffee and allows for storing beverages in the winter time, in addition to the cold storage function.

The freezer/refrigerator system according to the present invention has a compressor which is driven by a vehicle's engine. The compressor functions to equally supply a liquefied refrigerant to a vehicle's cooler unit and to the freezer/refrigerator unit. The cooler unit and the freezer/refrigerator unit have valve mechanisms which control the flow of the liquefied refrigerant supplied from the compressor. These valve mechanisms are alternately opened and closed by a control circuit thereby causing the liquefied refrigerant. The refrigerant is equally supplied to the cooling unit and to the freezer/refrigerator unit at given time intervals.

A refrigeration cycle is formed by utilizing a cooling cycle of the compressor which is driven by the vehicle's engine. Power source and compressor for the freezer/refrigerator need not be mounted. The freezer/refrigerator is installed in a small space inside of the vehicle and is controlled by the vehicle's engine.

BRIEF DESCRIPTION OF THE DRAWINGS

FIG. 3 is a block diagram of a control circuit for controlling the time cycles of the system shown in FIG. 1;

FIGS. 4A to 4E are timing charts of signals in the control circuit shown in FIG. 3;

DETAILED DESCRIPTION OF THE PREFERRED EMBODIMENT

Figure 1:
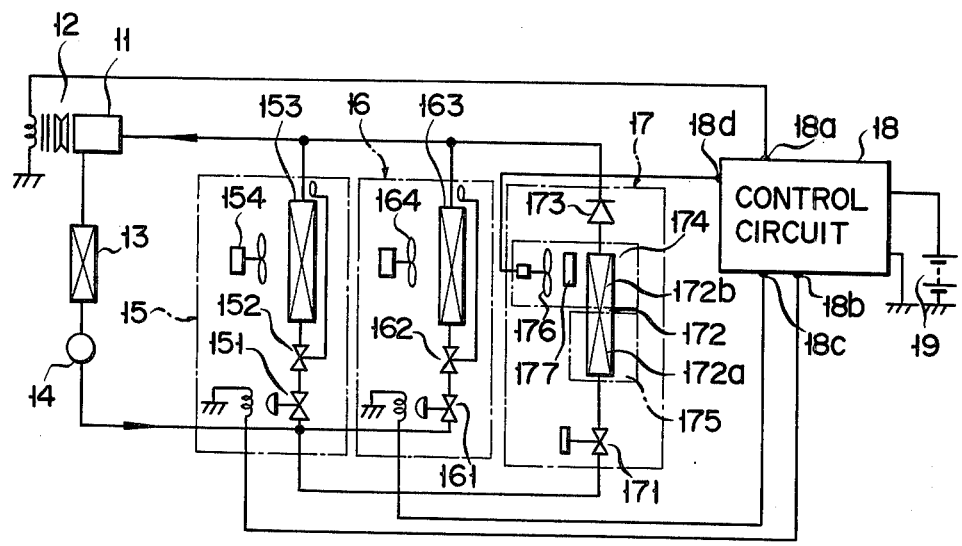
FIG. 1 is a block diagram showing an arrangement of a freezer/refrigerator system which is installed in a vehicle illustrating its refrigeration cycle according to one embodiment of the present invention.

FIG. 1 shows the refrigeration time cycle of a freezer/refrigerator installed together with a twin cooler system in a wagon type vehicle or the like. The freezer/refrigerator system has a compressor 11 which is connected to a transmission mechanism of a vehicle's engine (not shown) through an electromagnetic clutch 12. The compressor 11 is thus driven by the vehicle's engine. The compressor 11 supplies a refrigerant under pressure to a condenser 13. The condenser 13 liquefies the refrigerant and supplies it to a reserve tank 14. The reserve tank 14 functions to equally supply the liquefied refrigerant to a front side cooling unit 15 and a rear side cooling unit 16 which constitute the twin cooler system and further to a freezer/refrigerator unit 17. The conventional elements, e.g. compressor, condensers, etc., of the refrigerant circuit are connected by conventional piping lines.

The front side cooling unit 15 has an electromagnetic valve 151, an expansion valve 152 and an evaporator 153 which are all disposed in tandem with each other. The refrigerant from the reserve tank 14 is supplied to the evaporator 153 through the electromagnetic valve 151 and the expansion valve 152. The vaporized refrigerant in the evaporator 153 is fed back to the compressor 11.

Similarly, the rear side cooling unit 16 includes an electromagnetic valve 161, an expansion valve 162 and an evaporator 163. The refrigerant from the reserve tank 14 is supplied to the evaporator 163 through the electromagnetic valve 161 and the expansion valve 162. The vaporized refrigerant in the evaporator 163 is fed back to the compressor 11.

The freezer/refrigerator unit 17 includes a constant-pressure expansion valve 171, an evaporator 172 for the freezer/refrigerator and a check valve 173 which are all connected in tandem with each other. The refrigerant from the reserve tank 14 is supplied to the evaporator 172 through the constant-pressure expansion valve 171 which has an opening pressure of 0.5 kg/cm$^2$. The vaporized refrigerant in the evaporation 172 is fed back to the compressor 11 through the check valve 173.

The front side cooling unit 15 together with a fan 154 for blowing air into the inside of the vehicle is installed under a front instrument panel. The rear side cooling unit 16 together with a fan 164 is installed below the floor part behind a non-driver's seat.

The freezer/refrigerator evaporator 172 is divided into a freezer evaporator 172a and a refrigerator evaporator 172b. The freezer evaporator 172a is mounted in a freezer 175. The refrigerator evaporator 172b together with a fan 176 for blowing cold air is mounted in a refrigerator 174. A heater 177 which comprises a resistor (PTC element) with a positive temperature coefficient is mounted in a path of air from the fan 176.

Figure 2:
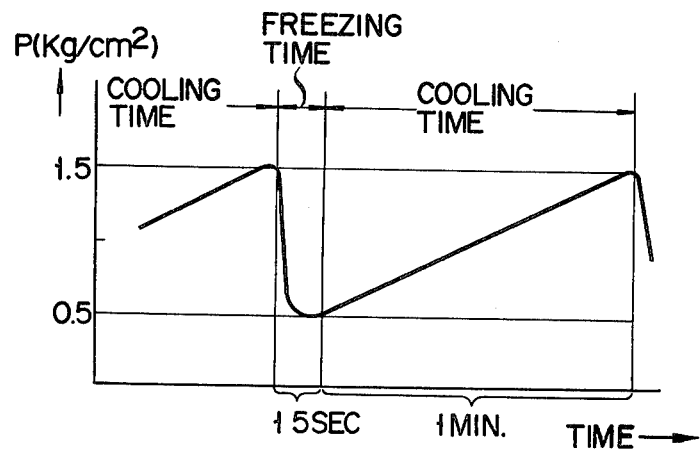
FIG. 2 is a graph showing the cooling and freezing time cycles of the freezer/refrigerator of the system in FIG. 1.

A control circuit 18 has a main switch for designating cooling or freezing/refrigeration. When the operator turns on the main switch, a current flows from a terminal 18a to the electromagnetic clutch 12 so as to transmit the rotational force of the vehicle's engine to the compressor 11. Further, the control circuit 18 has a timer circuit. As shown in FIG. 2, a cooling time interval of 1 minute and a freezing/refrigeration time interval of 15 seconds are alternately repeated. In the cooling time interval, a current flows from terminals 18b and 18c respectively to the electromagnetic valves 151 and 161 which are then opened. In the freezing/refrigeration time interval, a current flows from a terminal 18d to the fan 176 which is then driven.

The vapor pressures of the evaporators 153 and 163 of the front and rear cooling units 15 and 16, respectively, are kept at 2 kg/cm$^2$ or more by expansion valves 152 and 162 which are operated upon detection of heat. As described above, the constant-pressure expansion valve 171 of the freezer/refrigerator unit 17 is kept at the opening pressure of 0.5 kg/cm$^2$ which corresponds to the vaporizing temperature ($-21°$ C.) of the refrigerant.

Upon reception of an instruction from the control circuit 18, the electromagnetic valves 151 and 161 of the front and rear cooling units 15 and 16 are opened and the refrigerant starts to flow into the evaporators 153 and 163. The refrigerant is vaporized in the evaporators 153 and 163 and cooled air is blown by the fans 154 and 164 to the inside of the vehicle. Thus, when the electromagnetic valves 151 and 161 are opened and the refrigerant is vaporized, a refrigerant pressure P is increased as shown in FIG. 2. The constant-pressure expansion valve 171 for maintaining a pressure of 0.5 kg/cm$^2$ is in the closed state. The refrigerant is not supplied to the freezer/refrigerator evaporator 172.

When a time period of 1 minute has elapsed after the electromagnetic valves 151 and 161 are opened, the control circuit 18 closes the electromagnetic valves 151 and 161. The pressure P in the refrigerant circuit is then abruptly decreased and finally the constant-pressure expansion valve 171 is opened. Thus, the refrigerant is supplied to the freezer/refrigerator evaporator 172. When the freezing/refrigeration time interval of 15 seconds has elapsed, the control circuit 18 opens the electromagnetic valves 151 and 161 so as to perform cooling operation. The cooling time period of 1 minute and the freezing/refrigeration time period of 15 seconds are alternately repeated.

FIG. 3 shows the arrangement of the control circuit 18 which has a main switch 181 connected to a power source voltage V. When the operator turns on the main switch 181, a constant current signal with a waveform as shown in FIG. 4A is generated. This signal is supplied to an AND gate 182 and a differentiator 183. A coupling instruction from the terminal 18a is supplied to the electromagnetic clutch 12. Therefore, when the main switch 181 is turned on, the compressor 11 is driven by the vehicle's engine.

When the main switch 181 is ON, the fans 154 and 164 of the front and rear side cooling units 15 and 16 are driven, which is not illustrated in FIG. 3. The fan 176 of the freezer/refrigerator unit 17 is driven in response to an output from the terminal 18d.

The differentiator 183 generates a pulse signal in response to the ON state of the main switch 181. The waveform of the pulse signal is shown in FIG. 4B. This pulse signal is supplied to a flip-flop 185 through an OR gate 184 so as to set the flip-flop 185. The flip-flop 185 then supplies a signal of level "1" to the AND circuit 182. The output signal from the AND gate 182 also goes to level "1". Output signals from the terminals 18b and 18c are supplied to the electro-magnetic valves 151 and 152 of the front and rear side cooling units 15 and 16, respectively, to open them.

The control circuit 18 further has timers 186 and 187 which count time intervals of 1 minute and 15 seconds, respectively. The timers 186 and 187 start counting a clock signal from a clock oscillator 188 in response to a start signal. When a series of the time intervals of 1 minute and 15 seconds has alternately elapsed, the timers 186 and 187 respectively supply output signals of level "1" to differentiators 189 and 180, respectively. An output signal from the differentiator 189 is supplied to the timer 187 as the start signal and to the flip-flop 185 as a reset signal. An output signal from the differentiator 180 is supplied to the OR gate 184. An output signal from the OR gate 184 is then supplied as the start signal to the timer 186.

When the main switch 181 is ON, the timer 186 starts counting the clock pulse in response to the pulse from the differentiator 180 and the signal from the differentiator 180. The timer 187 starts counting the clock pulse in response to the signal from the differentiator 189. The waveforms of the signals from the differentiators 189 and 180 in order to start operating the timers 186 and 187 are shown in FIGS. 4C and 4D, respectively. The waveform of the signal from the flip-flop 185 is shown in FIG. 4E. Therefore, the electromagnetic valves 151 and 161 of the front and rear side cooling units 15 and 16 are opened every one minute at time intervals of 15 seconds.

Figure 5:
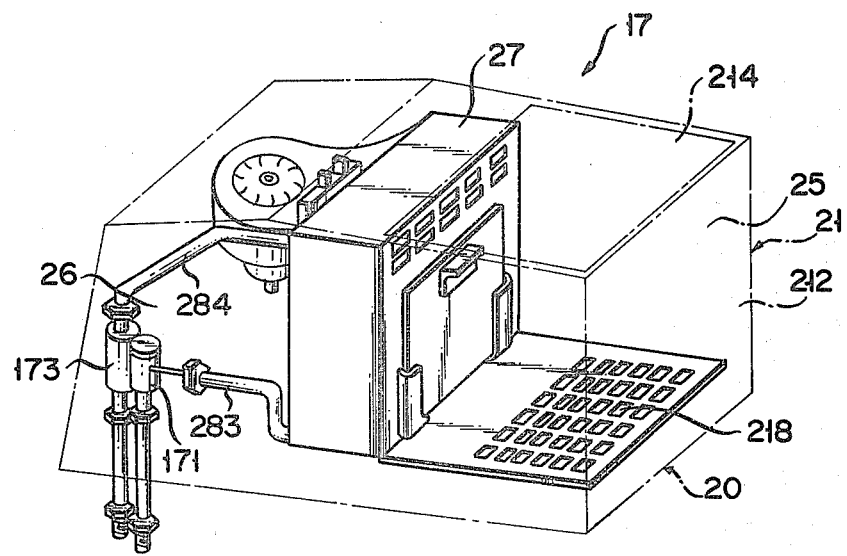
FIG. 5 is a perspective view of the freezer/refrigerator of the system shown in FIG. 1.
Figure 6:
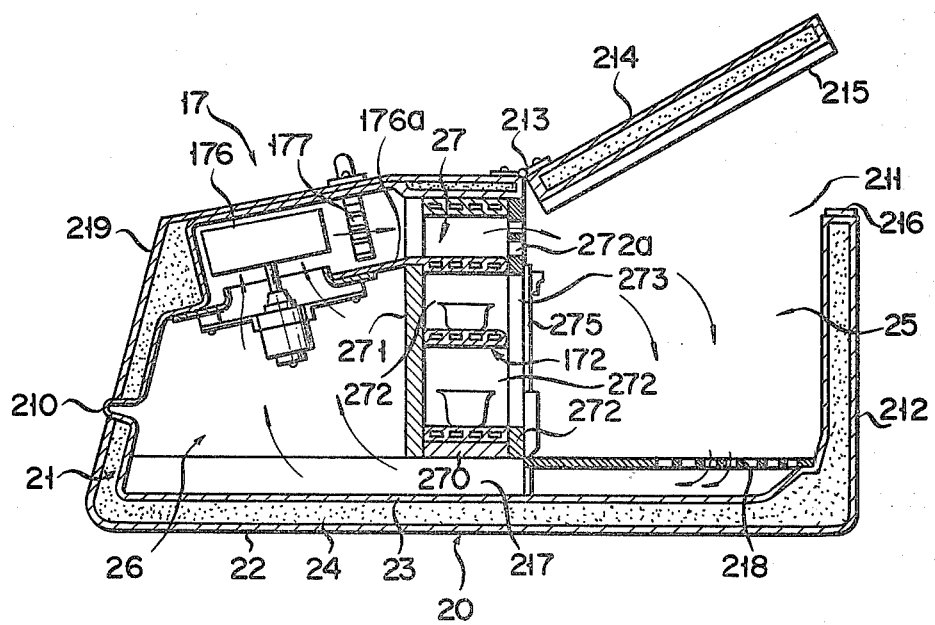
FIG. 6 is a sectional view of the freezer/refrigerator shown in FIG. 5.

FIGS. 5 and 6 show a structure of a freezer/refrigerator 20 of the freezer/refrigerator system 17. The freezer/refrigerator 20 has an outer case 21. The outer case 21 has a heat insulating structure in which a heat insulating material 24 such as hard polyurethane is injected between resin plates 22 and 23 made of polyethylene or polypropylene. The outer case 21 comprises a main case 212 having an opening 211 and a door 214 which is free to open or close the opening 211 by a hinge 213. The main case 212 is divided into a fan chamber 26 and a refrigerator chamber 25 whose area corresponds to the opening 211. An evaporator chamber 27 is disposed between the refrigerator chamber 25 and the fan chamber 26. The freezer/refrigerator evaporator 172 is housed in the evaporator chamber 27. A permanent magnet 215 which is fitted in a rubber member is mounted at the front edge of the door 214 so as to correspond to the opening 211. An iron piece 216 is mounted on the periphery of the opening 211. The permanent magnet 215 is attracted to the iron piece 216 to complete closing the opening 211 with the door 214.

A cold air path 217 is formed at the bottom of the main case 212 and below the evaporation chamber 27. The cold air path 217 communicates with the fan chamber 26 and with the refrigerator chamber 25 through a lattice 218 formed on the bottom plate of the refrigerator chamber 25.

Figure 7:
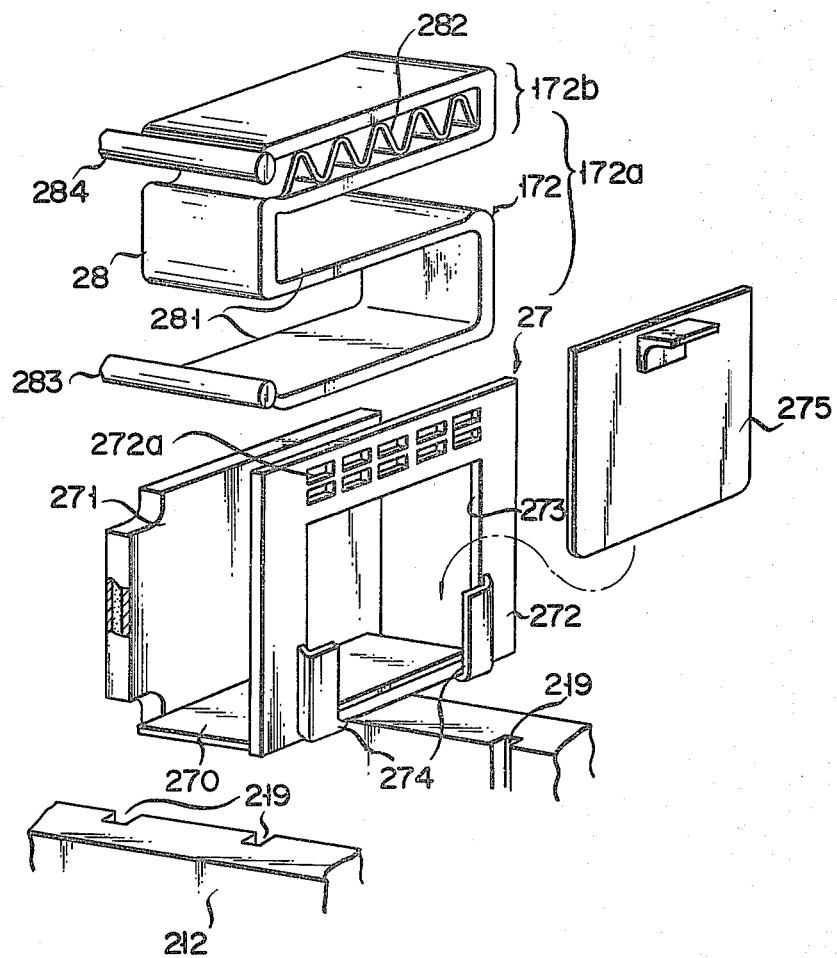
FIG. 7 is an exploded perspective view of the arrangement of a freezer/refrigerator evaporator housed in the freezer/refrigerator shown in FIGS. 5 and 6.

The evaporator chamber 27 is shown in FIG. 7. The evaporator chamber 27 comprises a back plate 271 which has the same heat insulating structure as the outer case 21, a front panel 272 which faces the refrigerator chamber 25, and a bottom plate 270 connecting the back plate 271 with the front panel 272. Both sides of the back plate 271 and of the front plate 272 are fitted in guide grooves 219 formed in the side walls of the main case 212. An opening 273 is formed in the front panel 272. A cover 275 is inserted in guide members 274 to close the opening 273. The evaporator chamber 27 can be opened by the detachable cover 275.

That portion of the evaporator chamber 27 which corresponds to the opening 273 is partitioned, thus defining a freezing chamber 27a. A series of main tube 28 in which the refrigerant flows constitutes the evaporator 172. The main tube 28 has a zigzag shape to form a plurality of shelves 281. The upper two shelves function as a refrigerator evaporator 172b, while the lower two shelves function as a freezer evaporator 172a. The freezer evaporator 172a corresponds to the opening 273 of the front panel 272. A corrugated fin 282 is disposed between the upper two shelves in order to cool the air passing therethrough effectively. The refrigerator evaporator 172b is opened to the fan chamber 26 and to the refrigerator chamber 25 through a lattice 272a of the front panel 272.

A refrigerant inlet pipe 283 and a refrigerant outlet pipe 284 of the freezer/refrigerator evaporator 172 extend into the fan chamber 26 of the main case 212. The constant pressure expansion valve 171 disposed in the refrigerant inlet pipe 283 and the check valve disposed in the refrigerant outlet pipe 284 are also arranged in the fan chamber 26. The pipeline connected to the constant-pressure expansion valve 171 and the check valve 173 extends outside the outer case 21.

Figure 8:
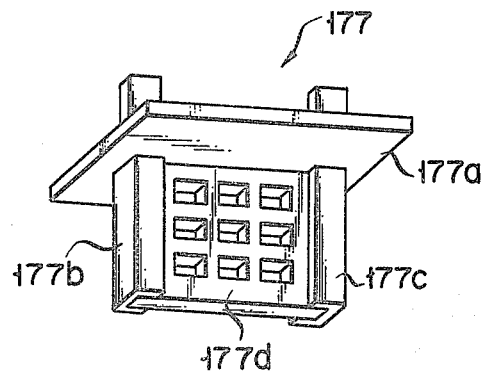
FIG. 8 is a perspective view of a heater mounted in the freezer/refrigerator shown in FIGS. 5, 6 and 7.
Figure 9:
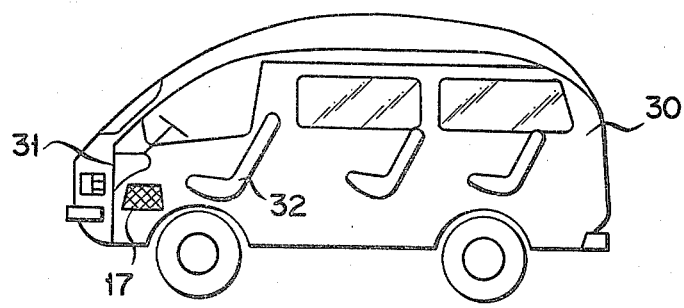
FIG. 9 is a side view for explaining the state of installment of the freezer/refrigerator on the wagon.

A fan mount 219 which is pivotally opened about a hinge 210 constitutes an upper part of the fan chamber 26 of the main case 212. The fan mount also closes the upper opening of the evaporator chamber 27. The fan mount is fixed by screws or the like so that the freezer/refrigerator system shown in FIG. 6 is assembled. The door 214 is mounted to the fan mount 219. The fan 176 is mounted on the inner surface of the fan mount 219. Air blown by the fan 176 is guided to the refrigerator evaporator 172b through a fan duct 176a of the evaporator chamber 27. The air is then supplied to the refrigerator chamber 25 through the lattice 272a. The heater 177 is disposed in the fan duct 176a. The heater 177 shown in FIG. 8 has a pair of electrodes 177b and 177c which extend perpendicularly to an insulating substrate 177a of a heat-resistant resin. A perforated PTC element 177d is fixed by the electrodes 177b and 177c. The heater is detachably mounted by screws. A current flows to the PTC element 177d through the electrodes 177b and 177c. Air heated by the heater 177 is supplied to the refrigerator chamber 25. The freezer/refrigerator unit 25 with the above arrangement is installed under a front instrument panel 31 of the body of a wagon 30, as shown in FIG. 9. Alternatively, the unit 25 may be installed under a seat 32.

In the freezer/refrigerator unit 17 according to the present invention, the refrigerant in the refrigerant pipeline passes through the constant-pressure expansion valve 171. The refrigerant is throttled by the constant-pressure expansion valve 171 and the pressure of the refrigerant is decreased to a pressure of less than 0.5 kg/cm². The vaporizing temperature of the refrigerant is kept at −21° C. This refrigerant is then used for ice-making in the freezing evaporator 172a. The refrigerant passing through the freezing evaporator 172a then cools air in the refrigerator evaporator 172b. The cool air is supplied to the fan chamber 26 through the refrigerator chamber 25 and the cooling air path 217. Therefore, food and beverages stored in the refrigerator chamber 25 can be properly cooled by the compulsory circulating air.

Since the heater 177 is not used for freezing/refrigeration, the heater 177 may be removed during freezing/refrigeration to reduce the air resistance.

However, when the freezer/refrigerator unit 17 is used for warming food and beverages in the winter time, the freezing and refrigerating time cycles are completely stopped. Power is supplied to the heater 177 to heat the air. The warm air is then supplied to the chamber 25 and circulated therein. Therefore, the food and beverages are kept warmed properly.

The present invention is not limited to the particular embodiment described above. Various changes and modifications may be made within the spirit and scope of the present invention. For example, the fan 176, the heater 177, the evaporator 172 and the like may be arranged in a different manner.

Figure 10:
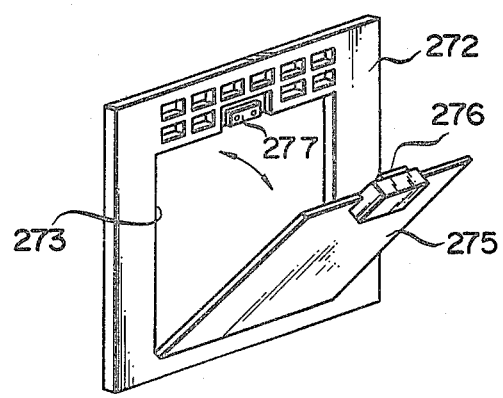
FIG. 10 is a view showing an arrangement of another cover of the evaporator shown in FIG. 7.

Further, the cover 275 of the front panel 272 of the evaporator chamber 27 may be pivotal about a hinge 275, as shown in FIG. 10. In this case, a permanent magnet 276 is mounted at the front edge of the cover 275 and an iron piece 277 is mounted on the surface of the front panel 275 in correspondence with the permanent magnet 276 to properly close the cover 275.

What we claim is:

1. A car air conditioner with a freezer/refrigerator, comprising:
    (a) a compressor adapted to be driven by the engine of a car for compressing gaseous refrigerant under high pressure;
    (b) a condenser for cooling the compressed refrigerant and for substantially liquefying the same;
    (c) a cooler unit having a first refrigerant line for supplying said unit with the liquefied refrigerant from the condenser;
    (d) a first evaporator connected into said first refrigerant line;
    (e) fan means for blowing air cooled by said first evaporator into the compartment of a car;
    (f) a freezer/refrigerant unit having a second refrigerant line connected in parallel with said first refrigerant line for supplying said freezer/refrigerator unit with the liquefied refrigerant;
    (g) a second evaporator connected into said second refrigerant line;
    (h) an outer case made of heat-insulative material, housing said second evaporator and having a door;
    (i) a refrigerator chamber provided with said outer case, the air in said refrigerator chamber being cooled by said second evaporator;
    (j) a freezer chamber provided within said outer case, the air in said freezer chamber being cooled by said second evaporator;
    (k) an electrically-controlled valve for controlling the flow of the refrigerant into said first refrigerant line;
    (l) first value means disposed in said second refrigerant line upstream of said second evaporator for controlling the flow of the refrigerant thereto, said valve means being closed to supply the refrigerant to said first evaporator when the electrically-controlled valve is open and being opened to supply the refrigerant to said second evaporator when the electrically-controlled valve is closed;

(m) second valve means disposed in said second refrigerant line downstream of said second evaporator for preventing a back flow of the refrigerant from said first refrigerant line to said second refrigerant line; and (n) a control circuit for opening and closing said electrically-controlled valve to thereby supply the refrigerant alternately to said cooler unit and said freezer/refrigerator unit.

2. A car air conditioner according to claim 1, wherein the electrically-controlled valve is opened at predetermined intervals under the control of said control circuit.

3. A car air conditioner according to claim 1, wherein the outer case is partitioned into the refrigerator chamber and a fan chamber, air being blown from said fan chamber through the refrigerator section of said second evaporator, and a cooling air path is defined between said refrigerator chamber and said fan chamber.

4. A car air conditioner according to claim 1, wherein the second evaporator comprises a zig-zag flat main tube.

5. A car air conditioner according to claim 4, wherein the second refrigerant evaporator is divided into an evaporator portion for freezing and an evaporator portion for refrigeration.

6. A car air conditioner according to claim 1, wherein the freezer chamber and the refrigerant chamber are divided by a panel having an opening therein in correspondence with a freezer section of said second evaporator, said opening being opened and closed by a cover.

7. A car air conditioner according to claim 3, wherein said second evaporator is divided into an evaporator portion for freezing and an evaporator portion for refrigeration, and including a fan in said fan chamber.

8. A car air conditioner according to claim 6, wherein said cover is a plate which is inserted downward along guides attached to said front panel.

9. A car air conditioner according to claim 1, wherein said door comprises a hinge mechanism, and one of a permanent magnet and a mass of magnetic material is disposed on an open end of said door, and the other of the permanent magnet and mass of magnetic material is disposed on that portion of said outer case which corresponds to the open end of said door.

10. A car air conditioner according to claim 7, wherein a corrugated fin is disposed at said evaporator portion for refrigeration and extends along said air path connected to said fan.

11. A car air conditioner according to claim 1, wherein the first valve means is disposed in said outer case to control the flow of refrigerant supplied to said second evaporator.

12. A car air conditioner according to claim 3, wherein said second evaporator is divided into an evaporator portion for freezing and an evaporator portion for refrigeration, the air from said fan chamber being supplied to said refrigerator chamber through said evaporator portion for refrigeration.

13. A car air conditioner according to claim 3, wherein a heater is provided within said air path connecting said fan chamber and said refrigerator chamber.

14. A car air conditioner according to claim 13, wherein said heater comprises a resistor having a positive temperature coefficient.

15. A car air conditioner according to claim 1, wherein the first valve means is a constant-pressure valve which is opened at a refrigerant pressure corresponding to a suitable refrigerant vaporizing temperature.

* * * * *